(12) United States Patent
Teichmann et al.

(10) Patent No.: US 9,171,039 B2
(45) Date of Patent: Oct. 27, 2015

(54) QUERY LANGUAGE BASED ON BUSINESS OBJECT MODEL

(75) Inventors: Jan Teichmann, Neustadt/Weinstrasse (DE); Thomas Gauweiler, Speyer (DE); Daniel Hutzel, Karlsruhe (DE); Udo Klein, Maximiliansau (DE); Marcel Hermanns, Heidelberg (DE); Jens Weiler, Weingarten (DE); Dirk Giebel, Walldorf (DE); Daniel Goldmann, Mannheim (DE); Frank Brunswig, Heidelberg (DE); Heiko Steffen, Ruelzheim (DE); Steffen Tatzel, Nussloch (DE); Joachim Fitzer, Schriesheim (DE)

(73) Assignee: SAP SE, Walldorf (DE)

( * ) Notice: Subject to any disclaimer, the term of this patent is extended or adjusted under 35 U.S.C. 154(b) by 59 days.

(21) Appl. No.: 13/249,229

(22) Filed: Sep. 29, 2011

(65) Prior Publication Data

US 2013/0086097 A1 Apr. 4, 2013

(51) Int. Cl.
*G06F 7/00* (2006.01)
*G06F 17/30* (2006.01)

(52) U.S. Cl.
CPC ............................... *G06F 17/30448* (2013.01)

(58) Field of Classification Search
CPC ..................... G06F 17/30448; G06F 17/30958
See application file for complete search history.

(56) References Cited

U.S. PATENT DOCUMENTS

| 6,134,559 | A * | 10/2000 | Brumme et al. ....................... 1/1 |
| 7,702,622 | B2 * | 4/2010 | Li et al. .................. 707/999.003 |
| 7,747,651 | B2 * | 6/2010 | Potter et al. .................... 707/795 |
| 8,015,039 | B2 * | 9/2011 | Brunswig et al. ............ 705/7.11 |
| 2002/0073115 | A1 * | 6/2002 | Davis .......................... 707/500.1 |
| 2002/0133497 | A1 * | 9/2002 | Draper et al. ................. 707/100 |
| 2002/0143748 | A1 * | 10/2002 | Cu et al. ............................. 707/3 |
| 2004/0006574 | A1 * | 1/2004 | Witkowski et al. ......... 707/104.1 |
| 2007/0027904 | A1 * | 2/2007 | Chow et al. .................... 707/102 |
| 2011/0145787 | A1 * | 6/2011 | Brunswig et al. ............. 717/120 |
| 2012/0041943 | A1 * | 2/2012 | Piedmonte ..................... 707/721 |
| 2012/0130942 | A1 * | 5/2012 | Dipper et al. ................. 707/602 |
| 2012/0143847 | A1 * | 6/2012 | Seo et al. ...................... 707/718 |

* cited by examiner

*Primary Examiner* — Daniel Kuddus
(74) *Attorney, Agent, or Firm* — Mintz Levin Cohn Ferris Glovsky and Popeo, P.C.

(57) ABSTRACT

Methods and apparatus, including computer program products, are provided for providing a query language based on a model. In one aspect, there is provided a computer-implemented method. The method may include receiving a first query; generating, based on a model including metadata representing a data structure, a second query specific to the data structure stored in a database; and sending the second query to the database. Related apparatus, systems, methods, and articles are also described.

15 Claims, 6 Drawing Sheets

430 — Column Store

| Country | US | US | JP | UK |
| Product | Alpha | Beta | Alpha | Alpha |
| Sales | 3,000 | 1,250 | 700 | 450 |

420 — Row Store

| Row 1 | US | Alpha | 3,000 |
| Row 2 | US | Beta | 1,250 |
| Row 3 | JP | Alpha | 700 |
| Row 4 | UK | Alpha | 450 |

410 — Table

| Country | Product | Sales |
|---|---|---|
| US | Alpha | 3,000 |
| US | Beta | 1,250 |
| JP | Alpha | 700 |
| UK | Alpha | 450 |

QUERY LANGUAGE BASED ON BUSINESS OBJECT MODEL

FIELD

The present disclosure generally relates to data processing.

BACKGROUND

A query language generally refers to one or more instructions used in connection with a database. For example, a query language typically defines data management and manipulation at a database, and may define how to control access to a database, how to create data in a database, how to read data in a database, how to update data in a database, how to delete data in a database, how to query data at a database, how to modify data in a data base, and the like. Examples of query languages are SQL, MDX, XPATH, and the like.

SUMMARY

The subject matter disclosed herein provides methods and apparatus, including computer program products, for query generation.

In one aspect, there is provided a computer-implemented method. The method may include receiving a first query; generating, based on a model including metadata representing a data structure, a second query specific to the data structure stored in a database; and sending the second query to the database.

In some implementations, the above-noted aspects may further include additional features described herein including one or more of the following. The generating may further include accessing metadata representing the data structure comprising at least one business object. The generating may further include generating the second query to include information to access at least one business object including at least one node and at least one association. The generating may further include generating the second query to include information to traverse a plurality of business object including nodes and associations without buffering intermediate results. The generating may further include generating the second query in accordance with SQL. The second query may be sent to the database comprising a relational database implemented in memory database. The second query may be sent to the database comprising a relational database implemented as a column database.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

DESCRIPTION OF THE DRAWINGS

In the drawings.

Like labels are used to refer to same or similar items in the drawings.

DETAILED DESCRIPTION

Figure 1:
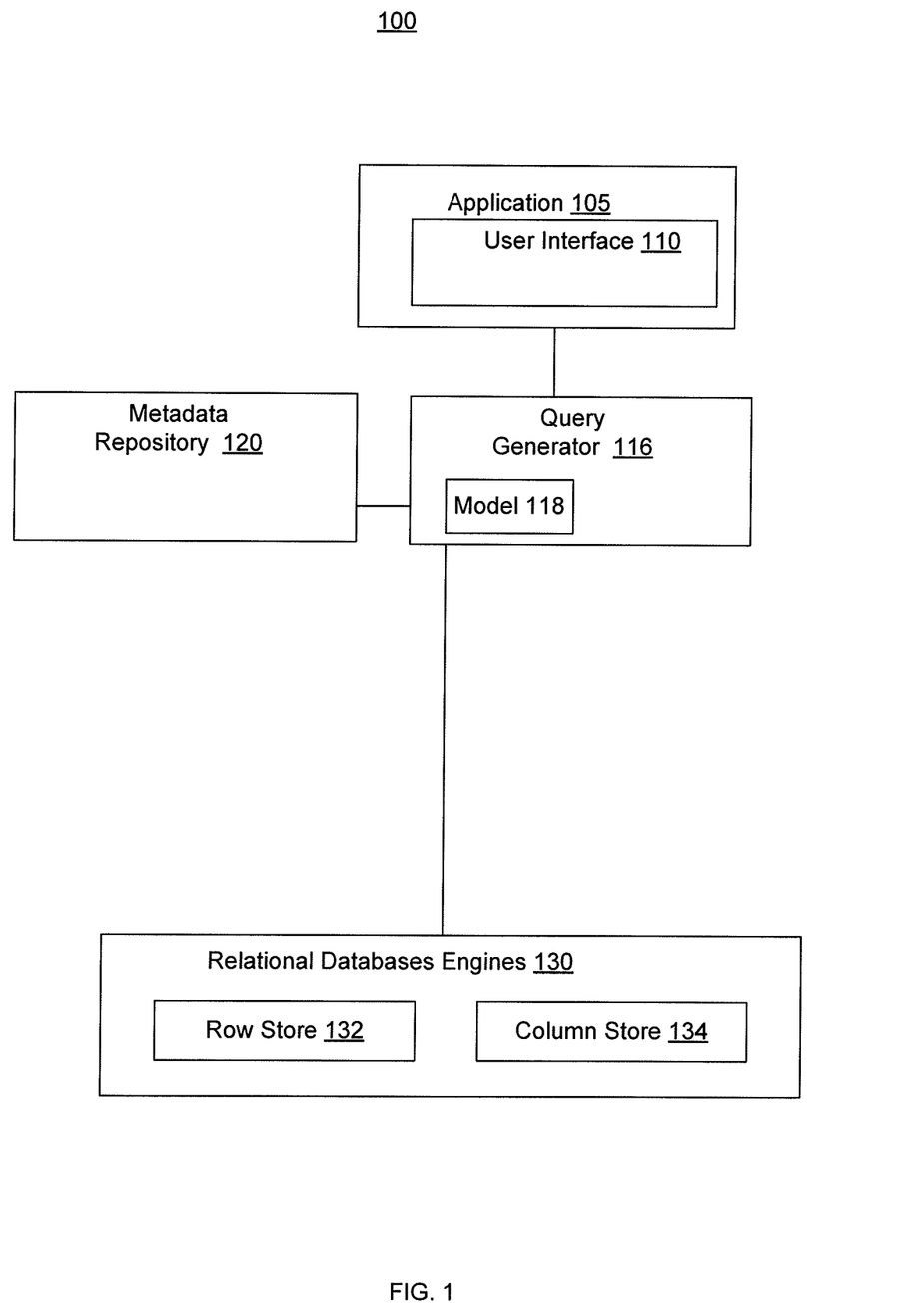
FIG. 1 depicts a block diagram of an example of a system for implementing a query language based on a model of a data structure, such as a business object.

FIG. 1 depicts a system 100 including an application 105, a user interface 110, a query generator 116, a metadata repository 120, and relational database engines 130, which further include a row store 132 and a column store 134. The query generator 116 further includes a model 118 defining a data structure, such as for example a business object. The query generator 116 generates, based on information obtained from model 118, a query specific to a data structure, such as for example a business object, stored at the relational database engines 130.

The application 105 may be implemented as a client application and may further include a user interface 110. For example, the application 105 may be configured as an application configured to access relational database engines 130.

The user interface 110 may be used to input a query of user relational database engines 130. The query provided at user interface 110 may be sent to query generator 116, where the query is transformed into a query specific to a data structure, such as for example a business object, stored at the relational database engines 130.

The query generator 118 may receive the query from the user interface 110 and, based on the model 118, generate a query specific to a data structure, such as for example a business object, stored at the relational database engines 130. In some exemplary embodiments, the user interface 110 includes query generator 118 (e.g., as a plug-in).

The model 118 may include metadata or access metadata stored at metadata repository 120. This metadata may define the data structure(s) stored in relational database engines 130. For example, a data structure, such as for example a business object, may have nodes, associations to other nodes, which in turn may have associations to yet other nodes. In some implementations, the business object represents a data structure including at least one of a data and a method organized to perform a business function/task, such as a sales order, a purchase order, etc. The business object may thus represent a relatively complex data structure.

The query generator 116 may define, based on model 118 including metadata represents a data structure, a query specific to the data structure. For example, the specific query defined by query generator 116 may enable, in some implementations, enhanced queries, when compared to other, more generalized queries, of the data structures, such as business objects, stored at relational database engines 130. Specifically, a generalized query of a complex data structure, such as a business object, may require multiple queries to relational database engines 130, each of the queries, or its intermediate results, being buffered until a final result set is returned to the user interface 110. On the other hand, a specific query (which is generated by query generator 116) of the relational database engines 130 may enable, in some implementations, a direct query of the relational database engines 130 with little, if any, buffering of intermediate results.

Figure 2:
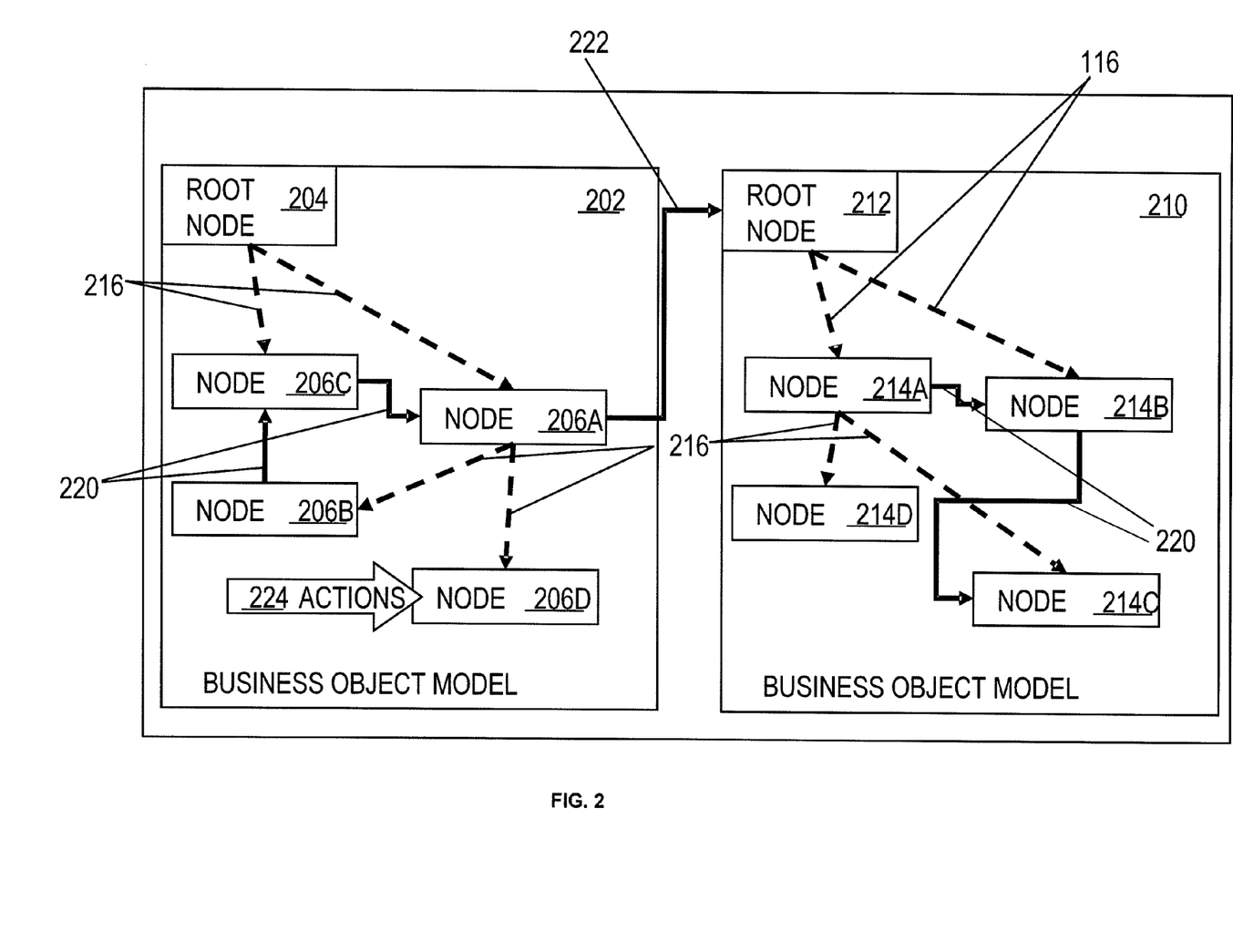
FIG. 2 depicts examples of models defining data structures, such as a business objects stored in a database.

FIG. 2 illustrates the relative complexity of the business objects stored at database engines 130 and the corresponding model 118 representing those stored business objects. As shown in FIG. 2, a first data object 202, which may also define a business object model, may include a first root node 204 as well as one or more first other nodes 206A, 206B, 206C, and 206D that are structured in a hierarchy. A second data object 210, which may also define a business object model, may include a second root node 212 as well as one or more second other nodes 214A, 214B, 214C, and 214D that are also structured in the hierarchy.

Each node (including the root nodes 204 and 212 and the other nodes 206 and 214) can have one association to its parent node and one or more than one association child nodes. In FIG. 2, parent-child associations, which are one possible kind of dependency, are shown as dashed arrows 216. In addition, the nodes can have intra-object associations 220 and cross-object associations 222 that link a node of the first data object 202 to a node of the second data object 210. In FIG. 2, associations between nodes, both intra-object associations 220 and cross-object associations 222, which are another possible kind of dependency, are shown as solid arrows. FIG. 2 shows one of the first other nodes 206A of the first data object 202 having a cross-object association 222 with the root node 212 of the second data object 210, another first other node 206B of the first data object 202 having an intra-object association 220 with another first other node 206C of the first data object 202, which in turn has an intra-object association 220 with the first other node 206A, and a second other node 214A of the second data object 210 having an intra-object association 220 with another second other node 214B of the second data object 210 which in turn has an intra-object association 220 with yet another second other node 214C of the second data object 210. Other types of cross-object associations are possible, including associations between a root node of one data object and a non-root node of a second data object and associations between another node of one data object and another node of the second data object. Other types of intra-object associations are also possible, for example between a root node of one data object and another node of another data object. In implementations using SQL, the SQL relations between tables (e.g., foreign key relationships) are derived from the business object node relationships (or "associations"), resulting in JOIN conditions on the database table level.

The model 118 may include metadata representing (e.g., defining) the data objects 202, 210, stored in relational database engines 130. In some implementations, this metadata is stored in metadata repository 120. The first and second data objects 202, 210, may also include one or more operations and actions 224 that can act upon the other elements of the data object. For example, as shown in FIG. 2, the first data object 202 includes an action 224 that is executed upon one of the first other nodes 206D.

In some implementations, when a first query is received from user interface 110, the query generator 116 may generate, based on model 118 including metadata representing, or defining, first and second data objects 202 and 210, a query specific to the data structures stored at relational database engines 130. For example, the specific query may completely define the nodes and associations needed to traverse a business object, which may enable a direct query of relational database engines 130. For example, the specific query may be generated to directly access root node 204 and nodes 206A-D and the associations between those nodes, without buffering intermediate results as the root node 204 and nodes 206A-D are traversed. Table 1 below provides an example of a query generated based on a query language. In the example of Table 1, a selection from purchase order root and items and related products is made after following an association.

TABLE 1

```
SELECT
   PO~ROOT-ID
   PO~ROOT-DESCRIPTION
   ...
   PO~ITEM→ITEM-ID
   PO~ITEM~PRODUCT→PRODUCT_ID
   ...
Into Internal_Table
FROM   PURCHASE_ORDER   AS   PO
WHERE PO~ITEM→PRICE   >   1000 USD
```

The query generator 116 may also route the generated query specific to the business objects to relational database engines 130. The relational database engines 130 receives the query formed by query generator 116 and returns a result set to user interface 110.

The relational database engines 130 may be implemented as any type of database. However, in some implementations, the relational database engines 130 are implemented as an in-memory database. An in-memory database keeps most, if not all, of the relevant database data in main memory rather than disk-based storage. Examples of main memory include cache, dynamic random access memory (DRAM), static random access memory, and the like.

Figure 3:
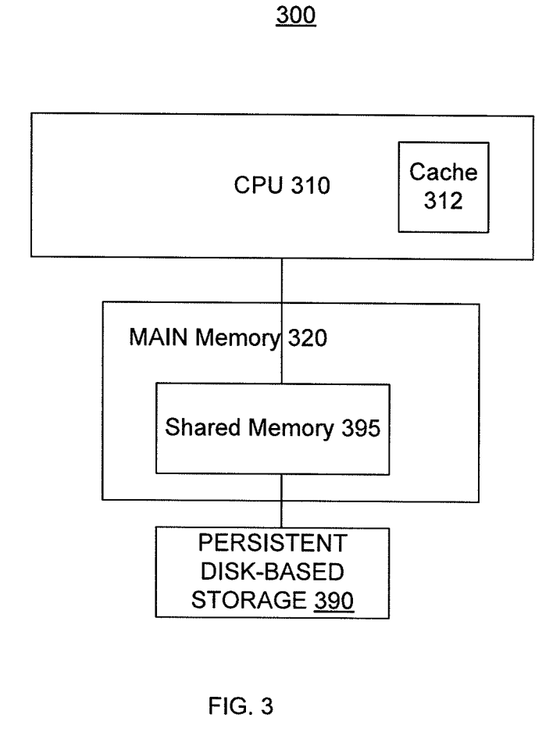
FIG. 3 depicts an example of an in memory implementation of a database.

FIG. 3 depicts a system 300 including a central processing unit 310, cache 312, main memory 320, and disk-based storage 390. In the implementation of system 300, the relational database engines 130 (e.g., the database management system application for the relational database engines 130) and the relevant data for the relational database engines 130 (e.g., data structures, such as business objects) are primarily maintained in main memory 320. When this is the case, any queries (e.g., queries generated by query generator 116) and/or calculation performed on the data uses main memory 320 rather than disk-based storage 390. In some implementations, such use of main memory 320 reduces data access latency times by at least an order of about 300. Furthermore, the application 105 may also be hosted at system 300. When that is the case, the data exchanged between application 105 and the relational database engines 130 may be via shared memory 395, which is contained within the main memory 320 used by both application 105 and the relational database engines 130.

Referring again to FIG. 1, the relational database engines 130 may be implemented as a column-oriented database 134, although a row-oriented database 132 may be used as well. A column-oriented database refers to a database management system configured to store relevant data based on columns, not rows. On the other hand, a row-oriented database refers to a database management system configured to store relevant data based on rows, not columns.

Figure 4:
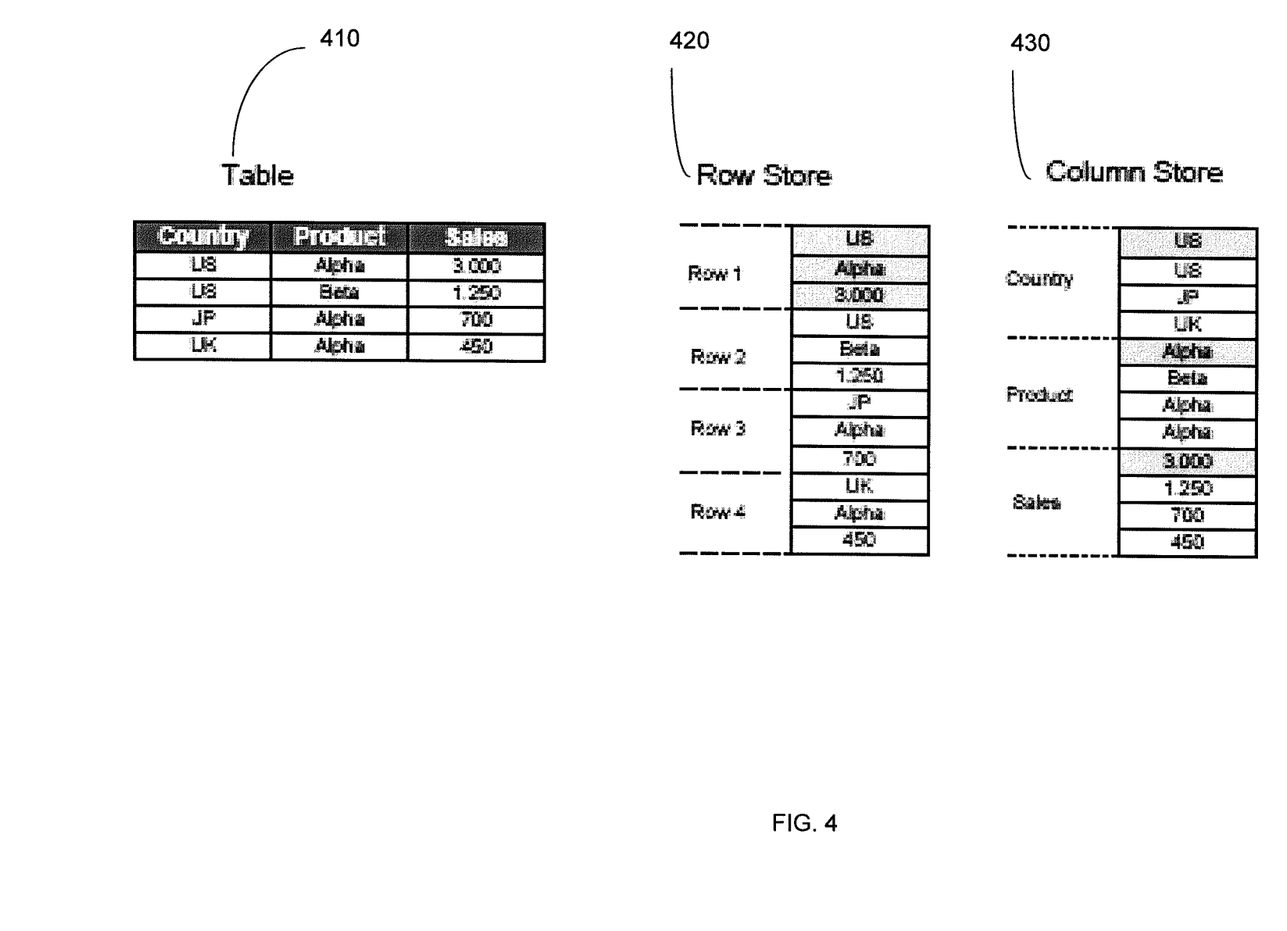
FIG. 4 depicts an example of row store and column store.

FIG. 4 depicts a table 410 including relevant data for country, product, and sales. In a row-oriented database, the relevant data is stored based on rows as depicted at row store 420; while in a column-oriented database, the relevant data is stored based on columns as depicted at column store 430.

Figure 5:
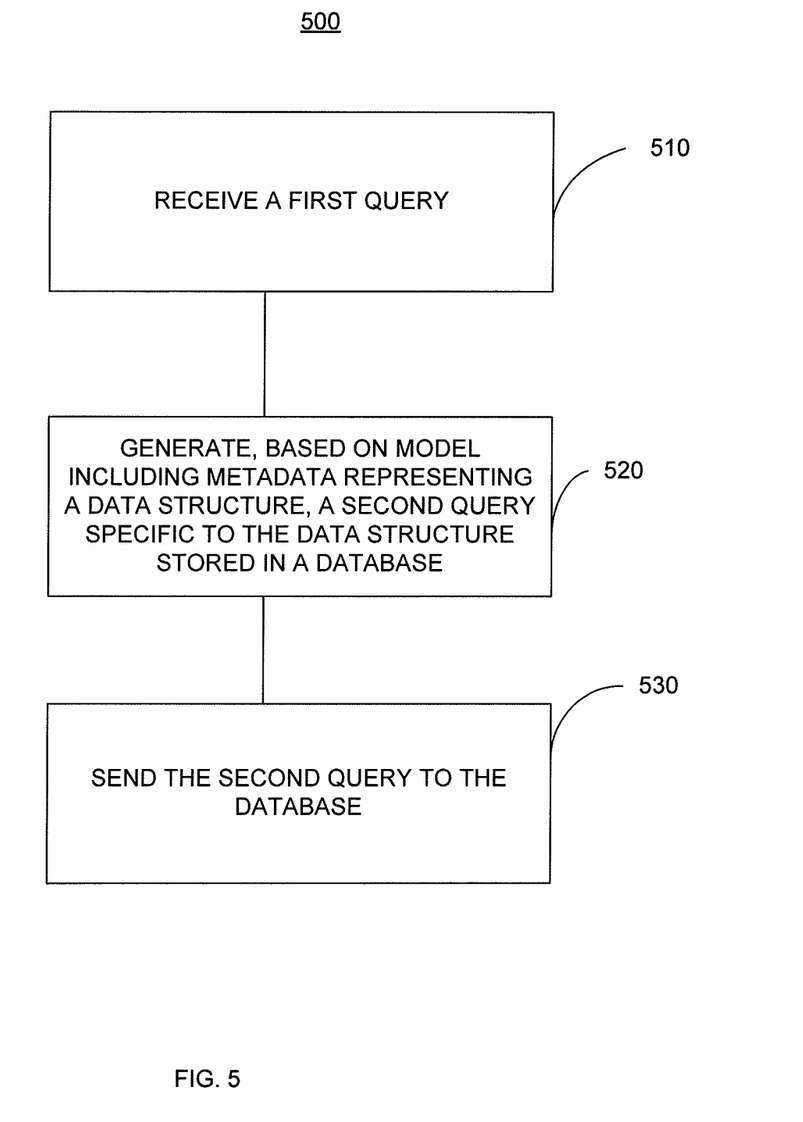
FIG. 5 depicts an example of a process for generating a query.

FIG. 5 depicts a process 500 for generating a query based on a model, such as a business object model. The description of FIG. 5 also refers to FIG. 1.

At 510, a first query may be received. For example, the query generator 116 may receive from user interface 110 a first query of relational database engines 130. The first query may be configured as an SQL query but other types of queries may be used as well.

At 520, a second query may be generated specific to the data structure stored in a database, and the second query may be generated based on a model including metadata representing the data structure. For example, the query generator 116 may generate a second query of relational database engines 130. The second query may be a query specific to the data structures, such as business objects, stored in relational database engines 130. To generate this second query, the query generator 116 may access model 118, which includes metadata representative of the data structures, such as business objects, stored in relational database engines 130. Based on the model including the metadata, the query generator 116 is able to form a specific query of the data structures, such as business objects, stored in relational database engines 130. In some implementations, the second query enables a direct query of the data structures (e.g., business objects) stored in relational database engines 130. For example, a single, direct query of the relational database engines 130 may be performed to obtain a result set, rather than multiple intermediate queries and buffering of intermediate results in order to traverse the data structure/business object.

At 530, the second query may be sent to the database. For example, the query generator 116 may send the generated second query (which is specific to the data structure/business object stored in relational database engines 130) to relational database engines 130 for execution. The relational database engines 130 may then send a result set to another entity, such as application 105 and/or user interface 110.

Figure 6:
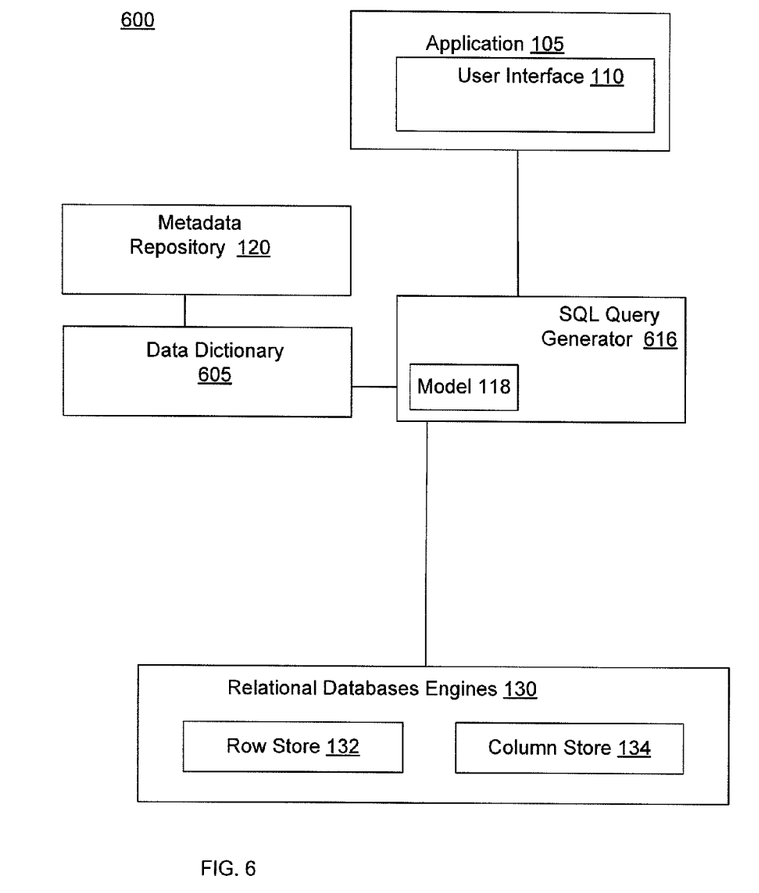
FIG. 6 depicts a block diagram of another example of a system for implementing a query language based on a model of a data structure, such as a business object.

FIG. 6 depicts a block diagram of another example of a system 600 for implementing a query language based on a model of a data structure, such as a business object. The system 600 is similar to system 100 in some respect but further includes a data dictionary 606 and an SQL query generator 616.

The data dictionary 606 provides table definitions for the database and the node names in which the database table data is stored. The SQL query generator 616 is similar to the query generator 116 in some respects, but the SQL query generator 616 is configured to handle and generate queries in accordance with SQL.

In some implementations, a query is modeled and generated during the design time. For example, the SQL query generator 616 are modeled as a query in a user interface design tool and associated with a user interface or an aspect of the user interface, so that the generated queries can be run later during runtime. Moreover, in the case of an in-memory column-based database, searching through large data volumes at nearly constant seek time may be considered a prerequisite for efficiency of the paging. Regarding paging, the second query at runtime may be executed page by page after each user action pointing to a displayed user interface page. Furthermore, all data may stay in the database and the data may not be transported to the user interface, except for the displayed page, so that the amount of data transport is relatively small, but the amount of data that is searched is nearly unrestricted. This may be considered a prerequisite to avoid any data caching/buffering in some of the higher layers.

In some implementations, the subject matter described herein may enable a developer to programmatically define a query based on the business objects, and the query generator may translate this query into standard SQL by accessing the data dictionary (that stores the metadata of the business objects, nodes and associations considering the mapping to tables and joins).

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

Although a few variations have been described in detail above, other modifications are possible. For example, while the descriptions of specific implementations of the current subject matter discuss analytic applications, the current subject matter is applicable to other types of software and data services access as well. Moreover, the term "exemplary" as used herein refers to an "example." In addition, the logic flows depicted in the accompanying figures and described herein do not require the particular order shown, or sequential order, to achieve desirable results. Other embodiments may be within the scope of the following claims.

What is claimed:

1. A non-transitory computer-readable storage medium containing instructions to configure a processor to perform operations comprising:
   receiving a first query;
   generating, based on a model including metadata representing a data structure, a second query specific to the data structure stored in a database, the second query being a single direct query to the database and defining all nodes and associations, including a root node, nodes dependent on the root node, and associations between all nodes, needed to traverse at least one business object and nodes stored in the database to generate a result set without buffering of intermediate results; and sending the second query to the database; and executing the second query page by page basis at runtime based on a page being displayed on a user interface used for executing the second query and using data transported from the database and associated only with the page being displayed on the user interface, the data associated with the displayed page is searched in and obtained from data stored in the database, and by searching an unrestricted amount of data at the database at constant seek time as a prerequisite of paging.

2. The non-transitory computer-readable medium of claim 1, wherein the first query is configured in accordance with SQL and received from a user interface.

3. The non-transitory computer-readable medium of claim 1, wherein the generating further comprises:

accessing the metadata representing the data structure comprising at least one business object.

4. The non-transitory computer-readable medium of claim 1, wherein the generating further comprises:

generating the second query to include information to access at least one business object including at least one node and at least one association.

5. The non-transitory computer-readable medium of claim 1, wherein the generating further comprises:

generating the second query in accordance with SQL.

6. The non-transitory computer-readable medium of claim 1, wherein the sending further comprises:

sending the second query to the database comprising a relational database implemented in memory database.

7. The non-transitory computer-readable medium of claim 1, wherein the sending further comprises:

sending the second query to the database comprising a relational database implemented as a column database.

8. A method comprising:

receiving, at a query generator, a first query;

generating, at the query generator, a second query specific to the data structure stored in a database, wherein the second query is generated based on a model including metadata representing a data structure, the second query being a single direct query to the database and defining all nodes and associations, including a root node, nodes dependent on the root node, and associations between all nodes, needed to traverse at least one business object and nodes stored in the database to generate a result set without buffering of intermediate results;

sending, from the query generator, the second query to the database; and executing the second query page by page basis at runtime based on a page being displayed on a user interface used for executing the second query and using data transported from the database and associated only with the page being displayed on the user interface, the data associated with the displayed page is searched in and obtained from data stored in the database, and by searching an unrestricted amount of data at the database at constant seek time as a prerequisite of paging.

9. The method of claim 8, wherein the first query is configured in accordance with SQL and received from a user interface.

10. The method of claim 8, wherein the generating further comprises:

accessing the metadata representing the data structure comprising at least one business object.

11. The method of claim 8, wherein the generating further comprises:

generating the second query to include information to access at least one business object including at least one node and at least one association.

12. The method of claim 8, wherein the generating further comprises:

generating the second query in accordance with SQL.

13. The method of claim 8, wherein the sending further comprises:

sending the second query to the database comprising a relational database implemented in memory database.

14. The method of claim 8, wherein the sending further comprises:

sending the second query to the database comprising a relational database implemented as a column database.

15. A system comprising:

at least one processor; and at least one memory, wherein the at least one processor and the at least one memory are configured to provide operations comprising:

receiving a first query;

generating a second query specific to the data structure stored in a database, wherein the second query is generated based on a model including metadata representing a data structure, the second query being a single direct query to the database and defining all nodes and associations, including a root node, nodes dependent on the root node, and associations between all nodes, needed to traverse at least one business object and nodes stored in the database to generate a result set without buffering of intermediate results;

sending the second query to the database; and executing the second query page by page basis at runtime based on a page being displayed on a user interface used for executing the second query and using data transported from the database and associated only with the page being displayed on the user interface, the data associated with the displayed page is searched in and obtained from data stored in the database, and by searching an unrestricted amount of data at the database at constant seek time as a prerequisite of paging.

* * * * *